Figure 1:
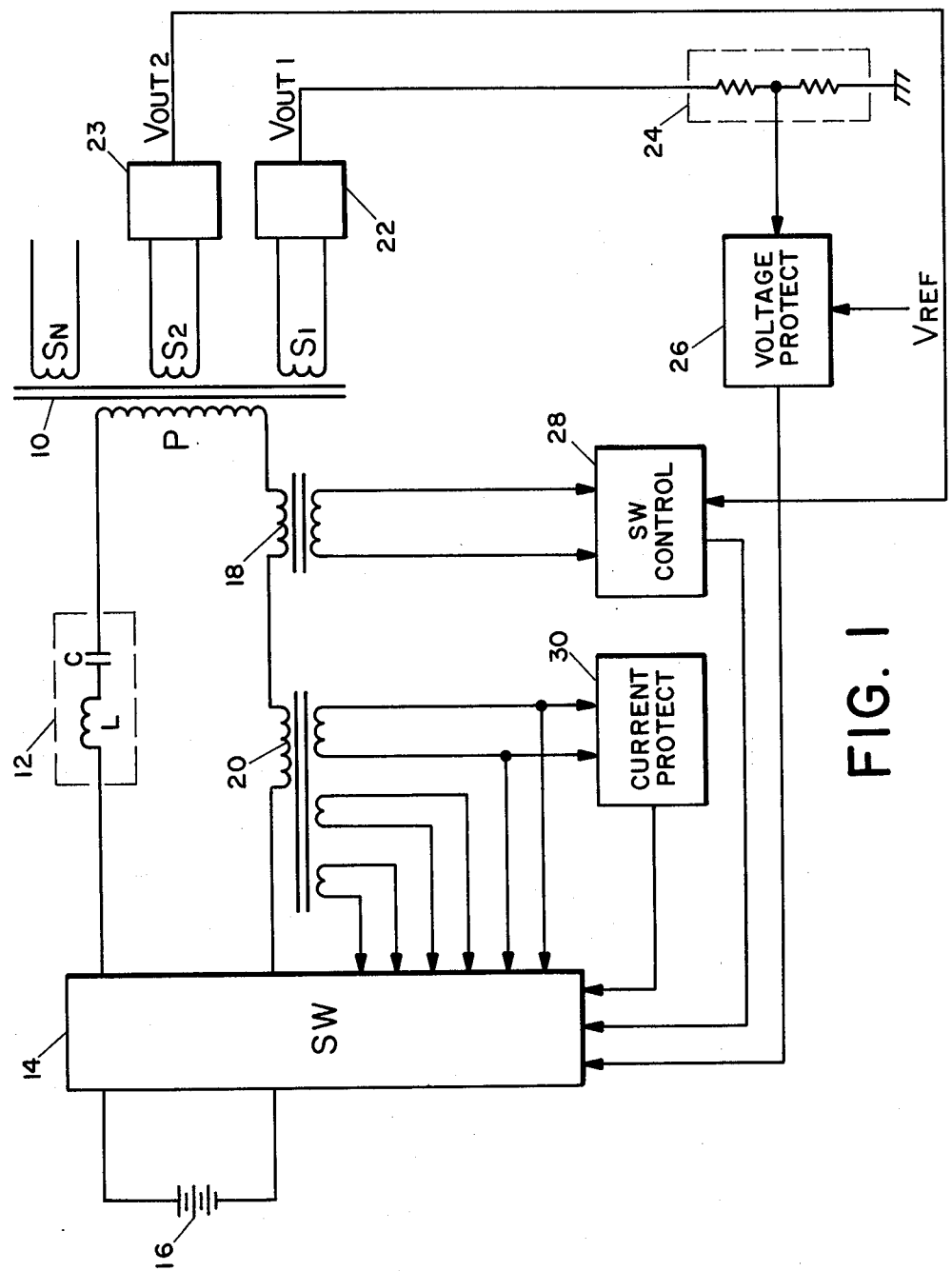

United States Patent [19]

Barter

[11] Patent Number: 4,464,709
[45] Date of Patent: Aug. 7, 1984

[54] CURRENT AND VOLTAGE PROTECTION FOR A POWER SUPPLY CIRCUIT
[75] Inventor: Archie M. Barter, Beaverton, Oreg.
[73] Assignee: Tektronix, Inc., Beaverton, Oreg.
[21] Appl. No.: 366,013
[22] Filed: Apr. 6, 1982
[51] Int. Cl.³ ............................................ H02H 7/122
[52] U.S. Cl. ........................................ 363/16; 363/19; 363/56; 361/98
[58] Field of Search ...................... 363/16, 17, 19, 23, 363/55, 56; 361/91, 98

[56] References Cited
U.S. PATENT DOCUMENTS

| 3,596,165 | 7/1971 | Andrews | 363/19 |
| 3,660,724 | 5/1972 | Berger | 363/56 |
| 3,840,798 | 10/1974 | Burchall et al. | 363/17 |
| 4,092,708 | 5/1978 | Gerding et al. | 363/56 |

Primary Examiner—William H. Beha, Jr.
Attorney, Agent, or Firm—John Smith-Hill

[57] ABSTRACT

A power supply circuit comprises a main transformer having a primary winding and a secondary winding, a series resonance circuit coupled to the primary winding of the main transformer, and a switching circuit for alternately supplying DC power to the series resonance circuit and discharging the energy stored therein. A current protection circuit controls the switching circuit in dependence upon the current in the switching circuit and a voltage protection circuit controls the switching circuit in dependence upon the voltage of the secondary winding of the main transformer.

4 Claims, 2 Drawing Figures

CURRENT AND VOLTAGE PROTECTION FOR A POWER SUPPLY CIRCUIT

This invention relates to a power supply circuit, more specifically to a high efficient switching regulator.

Electric equipment such as television receivers and oscilloscopes require various voltage supplies of different voltages and polarities for driving various electrical circuits and devices such as amplifiers and a CRT. Such voltages are usually derived from an AC voltage source which varies at different locations. For example, available AC voltage source may vary 80~250 volts and 50~400 Hz in frequency.

A transformer having a plurality of secondary windings of different winding ratios may be used for this purpose. However, such primitive technique is not satisfactory for many applications because of its low efficiency, heavy weight and inability to control the output voltages when the input AC voltage varies or fluctuates over a wide range. One practical solution to these problems is to provide one or more selectable taps to be selected manually depending on the input line voltage.

DC-DC converters are advantageous over the aforementioned primitive technique because they can operate at higher frequencies, e.g. 10 to 100 kHz. A light weight transformer using a low loss ferrite core can be used as the main transformer. The input line voltage is first rectified and smoothed to drive an oscillator operating at a certain high frequency mentioned hereinbefore. The oscillator output is coupled to the primary winding of a main transformer and the voltages induced in the secondary windings of different winding ratios are rectified and smoothed to obtain the required voltages. The amplitude of the oscillator output may be controlled in response to the line voltage or the load. This type of converter appreciably improves the efficiency and weight over the first mentioned power supply, but is still not highly efficient because there is a certain large quiescent or bias current of the oscillator.

Attempts have been made to further improve the efficiency of the DC-DC converter by decreasing the quiescent current. Switching regulators are ideal in terms of efficiency because the inductance of the transformer primary winding is intermittently energized by a DC voltage source by using an electronic switch and the energy stored in the primary winding is released by opening the switch. However, transients in the current through the primary winding cause noise or EMI (electromagnetic interference) to very sensitive electrical circuits within the equipment using the switching regulator or even neighboring equipment. A further type of power supply uses a series resonance circuit in series with the transformer primary winding and operates in a switching mode. The current in the transformer primary winding is substantially sinusoidal to provide high efficiency and low noise or EMI level. See U.S. Pat. No. 3,596,165 for a more detailed description of this advanced power supply which combines the advantages of the oscillation type DC-DC converters and the switching regulators.

In the last mentioned DC-DC converter, the switching circuit is controlled by sensing the current in the primary winding which is proportional to the input line voltage and the output load. The switching transistors are not properly protected when the load is abnormal or the main switch control circuit fails.

According to a first aspect of the present invention there is provided a power supply circuit comprising a main transformer having a primary winding and a secondary winding, a series resonance circuit coupled to the primary winding of the main transformer, a switching circuit for alternately supplying DC power to said series resonance circuit and discharging the energy stored therein, a current protection circuit for controlling the switching circuit in dependence upon the current in the switching circuit and a voltage protection circuit for controlling said switching circuit in dependence upon the voltage of the secondary winding of the main transformer.

According to a second aspect of the present invention there is provided an over current protection circuit for a power supply circuit including a switching circuit and a switch driving transformer having a control winding, said protection circuit comprising a first input terminal for connection to both ends of the control winding, a second input terminal for connection to the control winding at a point intermediate its ends, a first resistor connected to said first input terminal, a threshold conduction device connected between said first resistor and said second input terminal, and a silicon controlled switch connected between said first input terminal and said second input terminal, said silicon controlled switch comprising a first transistor having its emitter connected to said first input terminal and its base connected to the junction of said first resistor and said threshold conduction device, a second transistor of opposite conductivity type to said first transistor and having its collector connected to the base of the first transistor, its base connected to the collector of the first transistor and its emitter connected to said second input terminal, and a second resistor connected between the base of the second transistor and said second input terminal, said threshold conduction device remaining nonconductive, and consequently holding said transistors off, so long as the voltage applied to said first input terminal by the control winding remains below a predetermined value, and becoming conductive, and consequently turning said transistors on and shunting said control winding if said voltage attains said predetermined value, said transistors thereafter turning off when said voltage falls to a lower predetermined value.

The present invention may be used to provide a power supply with increased reliability while maintaining high efficiency. The voltage protection circuit operates in response to the output voltage induced in the secondary winding of the main transformer and effects control through the control winding, thereby eliminating the need for additional isolation between the input line source and the control circuit.

Figure 2:
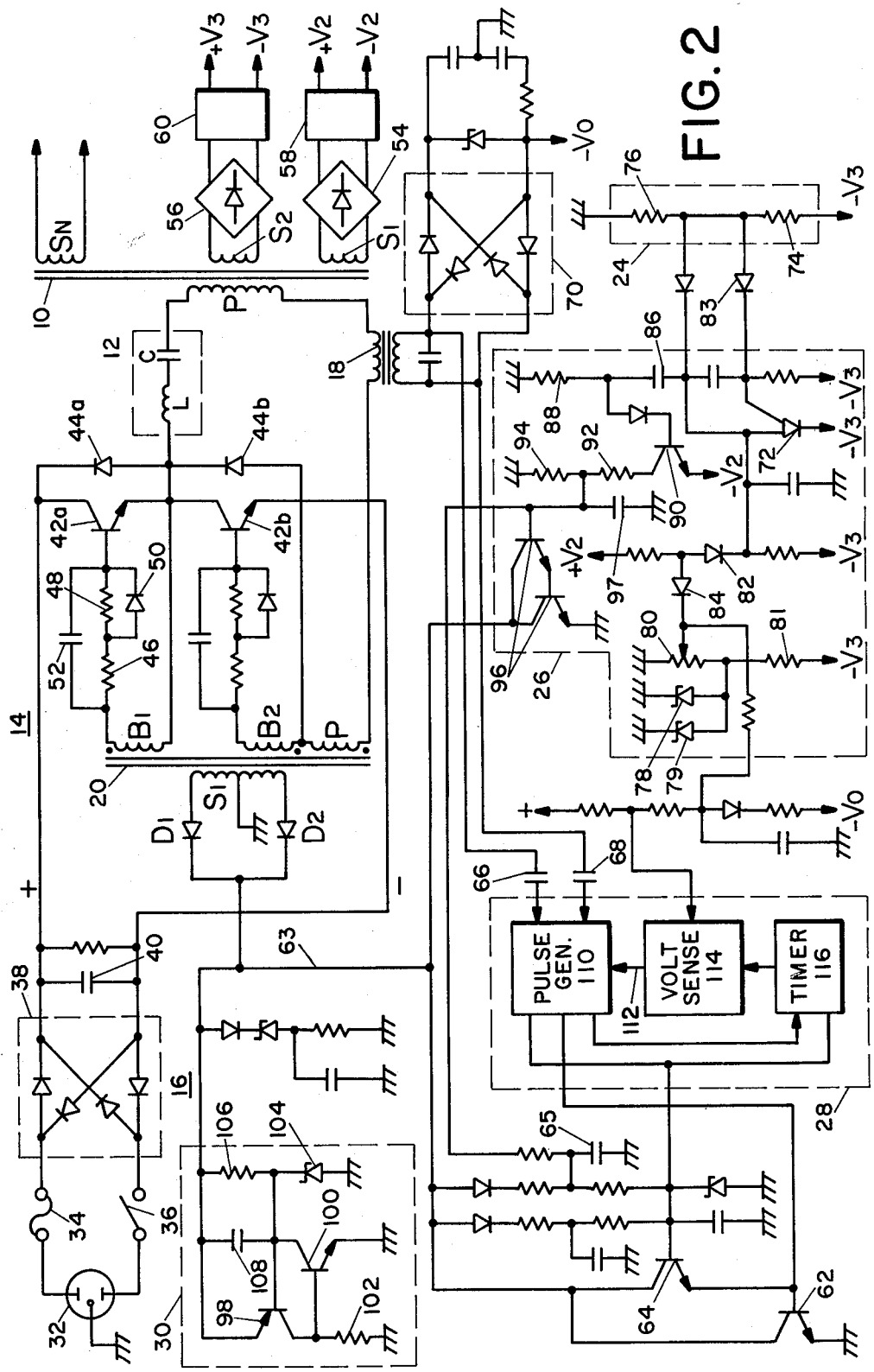

The construction, operation and resulting advantages of the invention will best be understood from the following detailed description of the invention referring, by way of example, to the accompanying drawing in which:

FIG. 1 is a simplified block diagram of a power supply circuit embodying the present invention; and FIG. 2 is a circuit schematic of the preferred power supply circuit.

FIG. 1 is a simplified block diagram of a power supply circuit according to this invention. Main transformer 10 is a high frequency transformer including primary winding P and a plurality of secondary windings $S_1, S_2 \ldots S_n$. Connected in series with primary winding P are series resonance circuit 12 comprising inductor L and capacitor C, switching circuit or inverter 14 including switching transistors (not shown), current sensing transformer 18, and switch driving transformer 20. Input DC voltage source 16 which may be derived from the input AC line voltage is applied to switching circuit 14. The output from current sensing transformer 18 is applied to main switch control 28 for controlling switching circuit 14. The output from transformer 20 is applied to switching circuit 14 to control the switching transistors and also to current protection circuit 30 whose output is connected to switching circuit 14. The output voltage induced in secondary winding $S_1$ is rectified and smoothed by rectifier/smoothing circuit 22 whose output $V_{out1}$ is subsequently supplied through resistive divider 24 to voltage protection circuit 26. Voltage protection circuit 26 compares the sample of the output voltage $V_{out1}$ with a reference voltage $V_{ref}$ for providing its output to switching circuit 14 when the output voltage tends to exceed a predetermined limit level. The output voltage induced in secondary winding $S_2$ is rectified and smoothed by rectifier/smoothing circuit 23 whose output $V_{out2}$ is supplied to switch control circuit 28. Although not shown in FIG. 1, the outputs derived from other secondary windings $S_3 \ldots S_n$ are either rectified to obtain DC output voltages or utilized directly as AC output voltages depending on particular applications.

In operation, switching circuit 14 in a first condition makes a first closed loop including DC voltage source 16, series resonance circuit 12, primary winding P, current sensing transformer 18 and switch driving transformer 20. The current in the primary winding P is essentially sinusoidal because of the use of series resonance circuit 12. When the current reduces substantially to zero, the switching transistors in switching circuit 14 are switched to a second condition and form a second closed loop including switching circuit 14, series resonance circuit 12, primary winding P and transformers 18 and 20. No. current is drawn from voltage source 16 in this period, but the energy stored in series resonance circuit 12 is released in the opposite direction to the first period. It is therefore understood that substantially sinusoidal current flows through primary winding P at a frequency substantially equal to the resonance frequency of resonance circuit 12. Switch control circuit 28 senses the zero crossing of the sinusoidal current and triggers a timing cycle. If the input voltage increases, the current flowing through the closed loop will increase. The increase in current is sensed as increased voltage $V_{out2}$, and the switch control circuit 28 responds to the increased voltage to decrease the conduction time of switching circuit 14. The output voltage is therefore maintained substantially constant regardless of the input voltage as long as switch control circuit 28 is operating normally.

If switch control circuit 28 is inoperative or failed for some reason, excessive current may destroy the switching transistors and the associated circuit components. However, current protection circuit 30 effectively detects such abnormalities and stops the operation of the power supply until the current level is reduced to a predetermined safe level. The current flowing is detected by a winding magnetically coupled to transformer 20.

The output voltage of the power supply is a function of the load connected to each secondary winding. For example, an excessive voltage may be produced if the load is light. Existence of an excessive voltage is effectively detected by voltage protection circuit 26. The sample of the output voltage from rectifier/smoothing circuit 22 is compared with the reference voltage $V_{ref}$. If the sample voltage exceeds $V_{ref}$, protection circuit 26 inhibits switching circuit 14. A timing circuit may be incorporated in voltage protection circuit 26 for stopping the power supply circuit for a certain time (e.g. 0.5 second) when an over voltage is detected.

The construction and operation of the power supply circuit and important portions such as current protection circuit 30 and voltage protection circuit 26 will be understood more clearly from the following description of FIG. 2 illustrating the circuit schematics of a preferred embodiment of this invention.

Plug 32 is connected to an appropriate receptacle to acquire an AC line voltage which is coupled through fuse 34 and power switch 36 to fullwave rectifier 38 for providing a corresponding DC voltage in capacitor 40. The DC voltage across capacitor 40, which is represented by battery 16 in FIG. 1, is supplied to switching circuit 14 including a pair of switching transistors 42a, 42b connected across capacitor 40. Connected across switching transistors 42a, 42b are diodes 44a, 44b. The junction of transistors 42a, 42b is connected to the lower end of capacitor 40 through series resonance circuit 12 (including inductor L and capacitor C), primary winding P of main transformer 10, current sensing transformer 18 and primary winding P of switch driving transformer 20. Transformer 20 further includes a center-tapped control winding S and a pair of base drive windings $B_1$, $B_2$ of opposite polarity to each other for respectively driving the bases of switching transistors 42a and 42b. The lower end of base drive winding $B_1$ (or $B_2$) is connected directly to the emitter of the respective transistor 42a (or 42b) while the upper end is connected to the base of such transistor through series resistors 46, 48 paralleled by speed-up capacitor 52. Also, diode 50 is connected across resistor 48 and shunts the resistor 48 when the associated transistor 42a (or 42b) is driven into conduction.

The opposite polarity of base drive windings $B_1$ and $B_2$ causes switching transistors 42a, 42b to conduct alternately depending on the polarity of the current in primary winding P of transformer 20. Assuming now that the switching circuit is in the aforesaid first condition, transistor 42a is conducting and the first closed loop is formed across capacitor 40 through transistor 42a, series resonance circuit 12, primary winding P of main transformer 10, current sensing transformer 18 and primary winding P of switch driving transformer 20. The positive half cycle of a sinusoidal current is generated. In the negative half cycle, switching transistor 42b is rendered conductive by the voltage in winding $B_2$. The energy stored in series resonance circuit 12 now flows through a second closed loop comprising transistor 42b, primary winding P of transformer 20, current sensing transformer 18, primary winding P of main transformer 10 and series resonance circuit 12. This is the aforesaid second condition of the switching circuit. The direction of the current flow is, of course, opposite to that of the previous half cycle, thereby completing a substantially sinusoidal current waveform in primary winding P of transformer 10.

Primary winding P of main transformer 10 acts as a pure resistance if transformer 10 is ideal with no loss. Voltages are induced in secondary windings $S_1$, $S_2 \ldots S_n$ depending on the winding ratios. The voltages derived from secondary windings $S_1$ and $S_2$ are respectively rectified by full-wave rectifiers 54, 56 and smoothed by smoothing circuits 58, 60 to obtain output DC voltages $\pm V_2$ and $\pm V_3$, respectively. The voltages $\pm V_2$ and $\pm V_3$ are utilized for various circuits including voltage protection circuit 26.

Current sensing transformer 18 is connected to control circuit 28 through capacitors 66, 68. As the current in current sensing transformer 18 goes through zero, a positive pulse is applied to control circuit 28, either through capacitor 66 or 68 depending on polarity, and a positive pulse is generated by pulse generator 110 and is applied to the base of transistor 62, holding transistor 62 on. When transistor 62 is turned on, control winding S of transformer 20 is shorted to ground through control bus 63, and consequently neither of the switching transistors 42a, 42b can conduct. Thus, the pulse width controls the switching duration of the inverter transistors, thereby controlling the power delivered to main transformer 10. In normal operation, the duration of the positive pulse occurring just after each zero crossing is varied by pulse generator 110 in response to the voltage applied at control terminal 112 and transistor 42a or 42b conducts for the remainder of the half cycle. The voltage applied to terminal 112 of pulse generator 110 depends both upon the voltage across capacitor 40 and upon the voltages $+V_2$ and $+V_3$ provided by smoothing circuits 58, 60. If the voltage is low, the conduction time will be long, and conversely if the voltage is high, the conduction time will be short.

If the voltage applied to terminal 112 moves outside the permitted tolerance range, as detected by voltage sensor 114, for more than a predetermined time, set by timer 116, a pulse is generated which turns on transistor 64, shorting control bus 63 to ground. As the power supply begins to shut down, the voltage across capacitor 65 turns on Darlington connected transistors 96, which hold control bus 63 to ground until capacitor 97 discharges (approximately 0.5 second).

Overvoltage protection circuit 26 includes a PUT (programmable uni-junction transistor) 72 to compare a sample of the output voltage $-V_3$ derived from resistive divider 24 including resistors 74, 76 with a reference voltage derived from a reference voltage generator including zener diodes 78, 79, potentiometer 80 and resistor 81. Two zener diodes of similar zener voltage are used to ensure failsafe operation. Diodes 82, 84 are used for temperature compensation. The anode voltage of transistor 72 is coupled to switching transistor 90 via capacitor 86 and resistor 88. The collector output of transistor 90 is then coupled to Darlington 96 via resistors 92, 94.

PUT 72 in the overvoltage protection circuit 26 is normally off, but turns on when its anode voltage is one diode drop above the gate voltage. This pulls the base potential of normally conducting transistor 90 down, thereby turning it off until the time constant of resistor 88 and capacitor 86 is reached. The time constant may be chosen to any desired value such as, for example, 0.5 second. Darlington 96 is turned on, disabling the power supply circuit by short-circuiting the secondary winding S of switch drive transformer 20. Overvoltage protection circuit 26 uses the secondary winding output of main transformer 10, thereby eliminating the need for additional primary to secondary isolation. The circuit accounts for transformer, rectifier and filter output impedances in the measurement. Because the circuit is entirely at secondary voltages, it is safer for a technician to test its operation for troubleshooting.

Over current protection circuit 30 consists principally of two transistors 98 and 100 connected as a silicon controlled switch, zener diode 104, resistors 102 and 106, and capacitor 108. This circuit is connected between the secondary winding S of switch drive transformer 20 and ground. The object of this circuit is to limit the current in the switching transistors to a safe level when the main control is not operating for testing protection circuits of the power supply circuit or when the main control circuit 28 has failed.

Over current protection circuit 30 operates as follows: Zener diode 104 determines the maximum voltage at the emitter of transistor 98. If a large current flows in switching transistor 42a (or 42b) a certain voltage is induced in the control winding S of transformer 10. If this voltage is higher than the zener voltage, both transistors 98, 100 will switch to conduction, shorting the control winding S to ground. The circuit provides the necessary control by stopping the inverter completely for an over current condition. When the current returns to a safe level set by the resistance of resistor 102, however, transistor 100 cannot remain in conduction state, thereby automatically releasing the circuit from the clamped state.

The over current protection circuit 30 lowers the stress on switching transistors 42a, 42b during the testing of other protection circuits and also when main control circuit 28 has failed. The stress on the LC components of series resonance circuit 12 is also eased. Conventional silicon controlled switches will not turn off as quickly as the described circuit and do not have adjustable turn off current level.

As will be understood from the foregoing description, the power supply circuit incorporates overvoltage protection circuit 26 to measure the main transformer secondary voltage and over current protection circuit 30 with the high efficiency switching sinusoidal converter (or inverter) circuit. The power supply circuit is, therefore, highly reliable without sacrificing the advantages of the basic power supply circuit.

It will be appreciated that the invention is not restricted to the particular circuits which have been described and illustrated, since it will be apparent to a person skilled in the art that modifications may be made without departing from the scope of the invention as defined in the appended claims. It should particularly be noted that the current and voltage protection circuits can also be applied to power supply circuits other than the described inverter.

I claim:

1. An over current protection circuit for a power supply circuit including a switching circuit and a switch driving transformer having a control winding, said protection circuit comprising a first input terminal for connection to both ends of the control winding, a second input terminal for connection to the control winding at a point intermediate its ends, a first resistor connected to said first input terminal, a threshold conduction device connected between said first resistor and said second input terminal, and a silicon controlled switch connected between said first input terminal and said second input terminal, said silicon controlled switch comprising a first transistor having its emitter connected to said first input terminal and its base connected to the junction of said first resistor and said threshold conduction device, a second transistor of opposite conductivity type to said first transistor and having its collector connected to the base of the first transistor, its base connected to the collector of the first transistor and its emitter connected to said second input terminal, and a second resistor connected between the base of the second transistor and said second input terminal, said threshold conduction device remaining non-conductive, and consequently holding said transistors off, so long as the voltage applied to said first input terminal by the control winding remains below a predetermined value, and becoming conductive, and consequently turning said transistors on and shunting said control winding if said voltage attains said predetermined value, said transistors thereafter turning off when said voltage falls to a lower predetermined value.

2. A power supply circuit comprising a main transformer having a primary winding and a secondary winding, a series resonance circuit coupled to the primary winding of the main transformer, a switching circuit for alternately supplying DC power to said series resonance circuit and discharging the energy stored therein, a current protection circuit for controlling the switching circuit in dependence upon the current in the switching circuit, and a switch driving transformer having a control winding, and wherein said current protection circuit comprises a first input terminal connected to both ends of the control winding, a second input terminal connected to the control winding at a point intermediate the ends thereof, a first resistor connected to said first input terminal, a threshold conduction device connected between said first resistor and said second input terminal, and a silicon controlled switch connected between said first input terminal and said second input terminal, said silicon controlled switch comprising a first transistor having its emitter connected to said first input terminal and its base connected to the junction of said first resistor and said threshold conduction device, a second transistor of opposite conductivity type to said first transistor and having its collector connected to the base of the first transistor, its base connected to the collector of the first transistor and its emitter connected to said second input terminal, and a second resistor connected between the base of the second transistor and said second input terminal, said threshold conduction device remaining non-conductive, and consequently holding said transistors off, so long as the voltage applied to said first input terminal by the control winding remains below a predetermined value, and becoming conductive, and consequently turning said transistors on and shunting said control winding if said voltage attains said predetermined value, said transistors thereafter turning off when said voltage falls to a lower value determined by the value of said second resistor.

3. A power supply circuit in accordance with claim 1, further comprising a rectifier for rectifying the voltage developed across the secondary winding of the main transformer and a voltage protection circuit which comprises a third input terminal for connection to the rectifier, comparator means for comparing the voltage at said third input terminal with a predetermined voltage level, a control terminal for connection to both ends of the control winding, and switch means connected between said control terminal and said point intermediate the ends of the control winding and responsive to the comparator means to shunt the ends of the control winding to said point and thereby interrupt operation of the switch driving transformer in the event that the voltage at said third input terminal exceeds said predetermined voltage level.

4. A power supply circuit in accordance with claim 3, wherein the voltage protection circuit includes timing means operative to turn the switch means off after a predetermined period has elapsed following turning on of the switch means.

* * * * *